United States Patent
Ting et al.

(10) Patent No.: US 9,118,656 B2
(45) Date of Patent: Aug. 25, 2015

(54) SYSTEMS AND METHODS FOR MULTI-FACTOR AUTHENTICATION

(75) Inventors: David M. T. Ting, Sudbury, MA (US); Omar Hussain, Lexington, MA (US); Gregg LaRoche, Littleton, MA (US)

(73) Assignee: Imprivata, Inc., Lexington, MA (US)

( * ) Notice: Subject to any disclaimer, the term of this patent is extended or adjusted under 35 U.S.C. 154(b) by 1147 days.

(21) Appl. No.: 11/698,271

(22) Filed: Jan. 25, 2007

(65) Prior Publication Data

US 2007/0186106 A1    Aug. 9, 2007

Related U.S. Application Data

(60) Provisional application No. 60/762,291, filed on Jan. 26, 2006, provisional application No. 60/789,363, filed on Apr. 5, 2006, provisional application No. 60/833,148, filed on Jul. 25, 2006.

(51) Int. Cl.
*H04L 29/00* (2006.01)
*H04L 29/06* (2006.01)

(52) U.S. Cl.
CPC .......... *H04L 63/0815* (2013.01); *H04L 63/104* (2013.01); *H04L 63/105* (2013.01); *G06F 2221/2101* (2013.01); *G06F 2221/2111* (2013.01); *H04L 2463/082* (2013.01)

(58) Field of Classification Search
USPC ........................... 725/105; 713/155, 168, 185
See application file for complete search history.

(56) References Cited

U.S. PATENT DOCUMENTS

| | | | |
|---|---|---|---|
| 5,944,824 A * | 8/1999 | He ................................... | 726/6 |
| 5,960,085 A | 9/1999 | de la Huerga | |
| 6,081,893 A | 6/2000 | Grawrock et al. | |
| 6,332,192 B1 | 12/2001 | Boroditsky et al. | |
| 6,339,828 B1 | 1/2002 | Grawrock et al. | |
| 6,385,729 B1 | 5/2002 | DiGiorgio et al. | |
| 6,408,389 B2 | 6/2002 | Grawrock et al. | |
| 6,651,168 B1 * | 11/2003 | Kao et al. ..................... | 713/185 |
| 6,668,322 B1 | 12/2003 | Wood et al. | |
| 6,691,232 B1 | 2/2004 | Wood et al. | |
| 6,698,021 B1 * | 2/2004 | Amini et al. .................. | 725/105 |
| 6,836,843 B2 | 12/2004 | Seroussi et al. | |
| 6,892,307 B1 | 5/2005 | Wood et al. | |
| 6,935,957 B1 | 8/2005 | Yates et al. | |

(Continued)

FOREIGN PATENT DOCUMENTS

EP    1280317 A1    1/2003

OTHER PUBLICATIONS

International Search Report for PCT/US2007/001910 dated Aug. 6, 2007 (4 pages).

(Continued)

*Primary Examiner* — Brandon Hoffman
*Assistant Examiner* — Michael D Anderson
(74) *Attorney, Agent, or Firm* — Morgan, Lewis & Bockius LLP

(57) ABSTRACT

Requests to gain access to secure resources are adjudicated according to authentication policies that include rules based on user-states derived from multiple heterogeneous access-control systems. Comprehensive user authentication and access control based on rules and policies that encompass a user's status in multiple access-control systems, including both logical access (e.g., Active Directory, RADIUS, Virtual Private Network, etc.) as well as physical access (e.g., card-based) control systems, may be realized.

18 Claims, 5 Drawing Sheets

(56) References Cited

U.S. PATENT DOCUMENTS

| | | |
|---|---|---|
| 6,944,768 B2 | 9/2005 | Siegel et al. |
| 2001/0002487 A1 | 5/2001 | Grawrock et al. |
| 2002/0112155 A1 | 8/2002 | Martherus et al. |
| 2002/0152211 A1 | 10/2002 | Jam |
| 2003/0005326 A1 | 1/2003 | Flemming |
| 2003/0023874 A1 | 1/2003 | Prokupets et al. |
| 2005/0086079 A1 | 4/2005 | Graves et al. |
| 2005/0177724 A1* | 8/2005 | Ali et al. ............ 713/168 |

OTHER PUBLICATIONS

Written Opinion of the International Searching Authority for PCT/US2007/001910 (5 pages).

"Plugging a Scalable Authentication Framework into Shibboleth" by Zhang, Proceedings of the 14th IEEE International Workshops on Enabling Technologies: Infrastructure for Collaborative Enterprise (WETICE '05), 0-7695-2362-5/05, 2005.

* cited by examiner

SYSTEMS AND METHODS FOR MULTI-FACTOR AUTHENTICATION

CROSS-REFERENCE TO RELATED APPLICATIONS

This application claims priority to and the benefit of U.S. provisional patent application Ser. No. 60/762,291, filed on Jan. 26, 2006, U.S. provisional patent application Ser. No. 60/789,363, filed on Apr. 5, 2006 and U.S. provisional patent application Ser. No. 60/833,148, filed on Jul. 25, 2006, the entire disclosures of which are incorporated herein by reference.

FIELD OF THE INVENTION

The invention relates generally to controlling and managing computer system access and authentication. More specifically, in one embodiment, the invention relates to systems and methods for using data from multiple access authorization systems to implement comprehensive user-authentication and access policies.

BACKGROUND

The number of computer applications used by large corporations has increased significantly over the past twenty years. For example, companies may employ separate applications for electronic mail, document control, financial applications, inventory management, manufacturing control and engineering functions, in addition to overall network access. Each application often requires a separate login procedure, including some form of known personal identification such as a user ID, a password or a key sequence or the validation of some inherent trait of the user, such as biometric authentication. The increase in the number of applications requiring user authentication requires significant effort on part of users of the both the users and systems administrators to create, remember, and secure these various forms of authentication data. Furthermore, from a management perspective, the proliferation of computer applications with varying security and sign-on procedures adds significant cost to the ongoing maintenance of a secure information technology infrastructure.

In a similar fashion, physical security of the workplace has also become a primary concern. It is now common practice to require workers to present physical access cards in order to be granted access to a building, room or other location. Typically, a physical access control system (PACS) manages access privileges to site locations by associating a person or group of people with one or more badge IDs that can be read, for example, by a card reader placed in close proximity to a locked door. One common implementation of a PACS uses Wiegand control signals to communicate signals from card readers placed about the controlled area to one or more control panels that determine whether to grant or deny access in accordance with various access policies. Based on these policies, the system generates electrical pulses again using the Wiegand protocol that in turn control the door lock.

The physical access cards rely on the uniqueness of the card and its physical possession by a user who either swipes it through a stripe reader or brings it into proximity to a wireless reader. The reader reads the card and transmits its unique badge identifier to a control panel that maintains a set of rules (or a general policy) for granting or denying access to the cardholder. Thus, various zones within a building can be controlled by placing readers at the entry points and doors that lead to protected zones. This creates a "transitive trust model" by granting the cardholder access privileges for a specific location based on the known relationship between the cardholder and the card, the rules dictating that cardholder's access rights to zones within a building, and the placement of readers at the entry points to those zones. Many companies have invested significant resources in implementing the physical and procedural infrastructure that supports such access-control systems.

Authentication criteria used to access secure computer resources generally involve something individuals might know (e.g., a password), something they have (e.g., a key or token), and/or an identifying trait of the individual (e.g., a fingerprint or iris image). Authentication systems that control access to physical locations (e.g., a building or a room) generally require the person requesting access to present an authentication device associated with that person, such as a RFID card, magnetic swipe card, or other physical object.

Conventional attempts at integrating logical access systems (e.g., access to computing systems or networks) and physical access systems (e.g., access to buildings, rooms, etc.) use a USB and/or serial-port based readers that read badge information from the cards and present information to a centralized server for authentication. The drawback of integrating PACS and logical access control systems using this approach is the need for all the systems to use a common protocol so information can be exchanged among the various components. Such an approach, in other words, requires that all the components be able to communicate and understand each other, and any subsequent changes to the environment (e.g., addition of new systems, upgrades, etc.) require additional programming and implementation efforts.

Many companies employ authentication systems for granting access to their computer systems and card-based systems for granting access to physical locations as described above, but these systems are separate and do not interact. Furthermore, many individuals are associated with multiple entities, each of which may use one or more authentication systems. However, the ability to leverage the data and infrastructure of the physical access-control system for authentication and access to secure computer systems (either by replacing the need for password and/or biometric-based authentication or by implementing multi-factor authentication that combines data from multiple systems) remains elusive. This is especially difficult where the multiple systems are managed as separate physical and/or logical entities. What is needed is a system that can establish links between disparate user authentication systems, such as a system used to control access to a physical location, authentication systems used to govern access to the computer systems that operate within a physical location, and other systems for authentication/identification. Such a system would provide higher levels of access control by facilitating multi-factor authentication based on multiple forms of challenge that can incorporate authentication credentials from external systems, while simultaneously streamlining the authentication process for individuals within the organization.

SUMMARY OF THE INVENTION

The present invention provides comprehensive user authentication and access control based on rules and policies that encompass a user's status in multiple access-control systems, including both logical access (e.g., Active Directory, RADIUS, Virtual Private Network, etc.) as well as physical access (e.g., card-based) control systems. When a user requests access to a secure computer system, a software agent (residing, for example, on the client machine from which the user is requesting access) intercepts the request and redirects authentication criteria supplied by the user to a centralized single-sign-on ("SSO") or identity server. The identity server, having compiled and/or received user-specific authentication policies (stored, for example, in a database on or in communication with the identity server) based on various rules and events that can be validated by querying one or more other access-control systems, determines which authentication checks are necessary and whether subsequent authentication credentials should be requested from the user. In cases where the user is working "offline" (i.e., he is not connected to the identity server), the policies can be stored locally on the client machine and operate asynchronously until the client reestablishes communication with the server. By providing an application-neutral software agent at the client and a server that can query multiple access-control systems in their native protocols, requests to access secure resources can be adjudicated based on a comprehensive, user-specific policy that encompasses rules from multiple access control systems without the need to modify those systems.

Accordingly, in one aspect, the invention authenticates a user to a secure resource (e.g., a local or remote computer system or a secured physical location) in response to a request from a user to access the resource. The request includes at least one user-authentication credential (which in some instances can be validated). In response to the user-authentication credential(s), a policy specifying access criteria for granting the user access to the secure resource is provided. The policy is based on rules associated with (e.g., residing in or otherwise governing the operation of) one or more access-control systems. Respective users states from each of the access control systems are received, and based on the returned users states, a determination is made as to which rules (either all or some subset) are satisfied, and as a result, whether the policy is met. The user's request to access the resource is adjudicated based on the results of the determination.

In some embodiments (e.g., where the user is requesting access from a client workstation within the secure computer system), the request is received from a client machine. In other cases, such as when a user is requesting access from a remote location, the request is received from a remote-access server acting as a proxy and/or gateway for the secure computer system. The user authentication credentials can include one or more of a user identification code, a secure access code, biometric data, a badge ID, a screen name, and/or a password for granting a user's request to access to secure applications. The access control systems can include one or more of the following: an active directory-based computer system, a virtual private network, a remote access control system, a physical access control system, a video surveillance system, alarm monitoring events and/or a workflow system.

For example, in some embodiments, the rules can include time-based access rules (e.g., a user cannot access a certain resource during non-business hours), location-based access rules (e.g., a user can only access workstations that are within an area she entered by presenting a valid badge), and/or resource-based rules (e.g., a user cannot access a production server). In some embodiments, combinations of the various types of access-control data are used to build complex profiles that can be used to adjudicate a user's access request. In certain instances where a user is denied access, a second access request including a prompt for additional authentication criteria can be issued, and access granted based on the subsequent credential submission.

Results of the determination of whether to grant or deny access can, in some instances, be stored (in a database, for example) and used as audit records to maintain historical authentication and access information. The audit records can also be analyzed to determine trends or anomalies in the data, and based on the analysis, the access policies can be updated.

In a second aspect, the invention provides a system for authenticating a user to a secure resource. The system includes an access-control agent for intercepting a user's request to access a secure resource (e.g., a local computer system, a remote computer system, a server, a secure physical location), where the request includes user authentication credentials. The system also includes an authentication server for providing user access policies based on rules associated with one or more other access-control systems, and which specify criteria for granting the user access the resource. The server also determines if the rules are met, and adjudicates the user's request based on the user access policies.

The authentication server can also include communication interfaces that are configured to communicate with various access-control systems (e.g., an interface to a security system such as a card-based physical access system) using communications protocols native to the access control systems.

In another aspect of the invention, a global access server adjudicates requests to access a secure resource. The global access server includes an interface for communicating with an access-control agent and of access-control systems, a database for storing access policies for granting access to the secure resource which are based on rules associated with the access-control systems, and a policy engine for determining, in response to a user request received from the access-control agent and user states received from the access-control systems, whether the rules are met so as to satisfy the access policies and adjudicating the user request based on the determination.

In another aspect, the invention comprises an article of manufacture having a computer-readable medium with computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, DVD-ROM or downloaded from a server. The functionality of the techniques may be embedded on the computer-readable medium in any number of computer-readable instructions, or languages such as, for ekample, FORTRAN, PASCAL, C, C++, Java, PERL, LISP, JavaScript, C#, Tcl, BASIC and assembly language. Further, the computer-readable instructions may, for example, be written in a script, macro, or functionally embedded in commercially available software (such as EXCEL or VISUAL BASIC).

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present invention facilitates the inclusion of user and environmental state information from multiple access-control systems into a comprehensive access-control policy for access to logical and/or physical resources without the need for costly, time-consuming adaptations to currently deployed systems.

Figure 1:
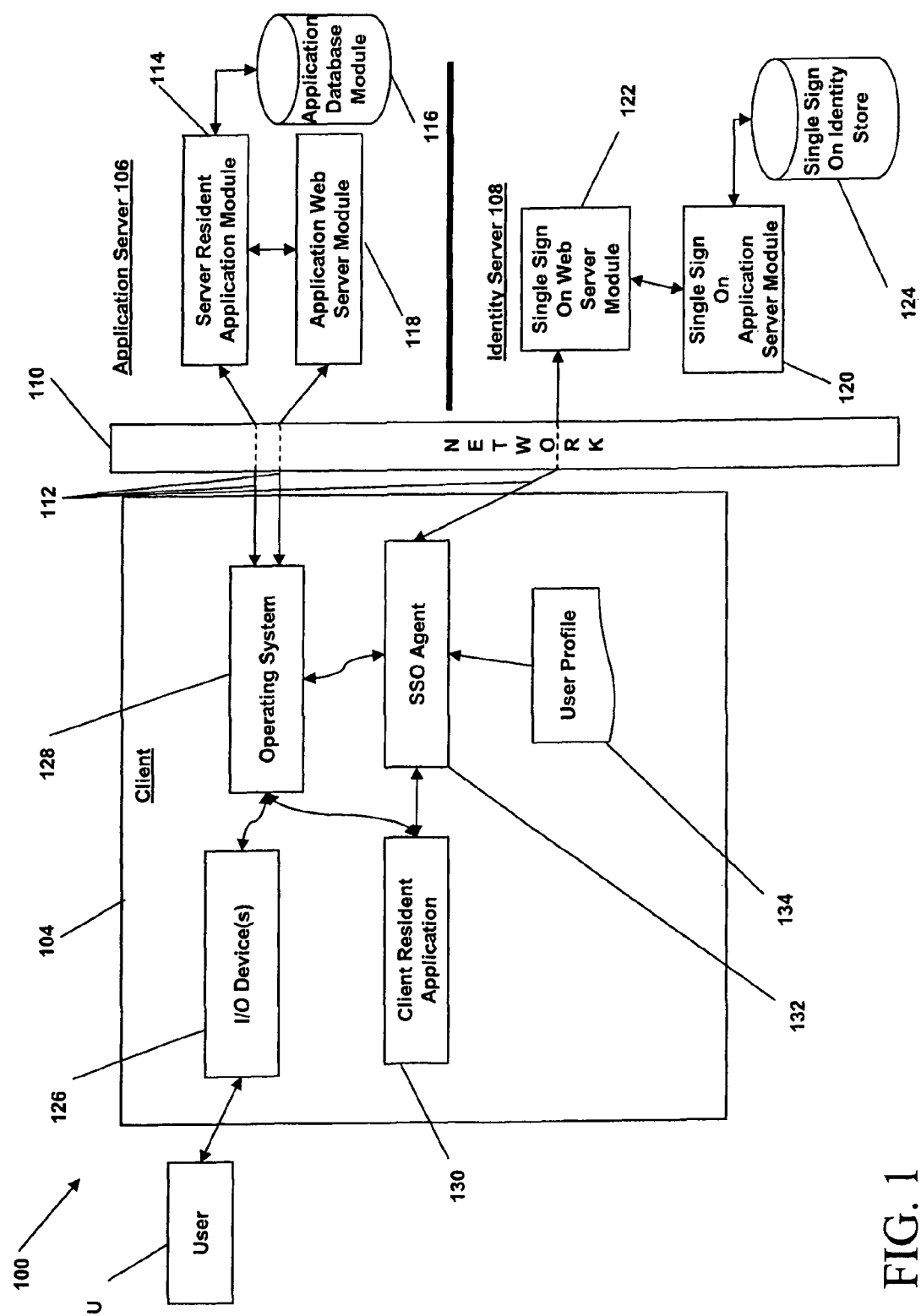
FIG. 1 is a block diagram of a system to authenticate a user and automate login to one or more applications using a client-resident user profile and a single-sign-on server in accordance with the invention.

In broad overview, FIG. 1 illustrates an embodiment of a system 100 for automating user logon procedures, auditing user activity within one or more applications, and consolidating user authentication credentials in a central data store. The system 100 includes a first computing system (a "client") 104, a second computing system (an "application server") 106 and a third computing system (an "identity server" or "single-sign-on server") 108, all in communication with each other via a network 110. The client node 104 is used by one or more users, indicated graphically at U. The client node 104, the application server 106 and the identity server 108 are in communication with the network 110 using communication channels 112.

For example, the communication channels 112 can connect the client 104 to a local-area network (LAN), such as a company intranet, a wide area network (WAN) such as the Internet, or the like. The client 104 and servers 106, 108 communicate with the network 110 through the communication channels 112 using any of a variety of connections including, for example, standard telephone lines, LAN or WAN links (e.g., T1, T3, 56 kb, X.25), broadband connections (ISDN, Frame Relay, ATM), wireless connections (e.g., 802.11, Bluetooth), and the like. The connections can be established using a variety of communication protocols (e.g., HTTP(S), TCP/IP, SSL, IPX, SPX, NetBIOS, Ethernet, RS232, direct asynchronous connections, a proprietary protocol, and the like). In one embodiment, the client 104 and the servers 106, 108 encrypt all communication when communicating with each other.

Each of the servers 106, 108 can be any computing device capable of providing the services requested by the client 104. Particularly, this includes logging into secure applications, tracking user activities within applications, and terminating a user's access to applications as described in more detail below.

The application server 106 includes one or more server-resident application modules 114 and one or more application database modules 116. The application server 106 may also include an application web server module 118 to facilitate communication with the client 104 over the network 110 where the communication network 110 is the Internet, an intranet, or the like. The identity server 108 includes a single-sign-on application server module 120, a single-sign-on web server module 122, and a single-sign-on identity data store 124. The modules throughout the specification can be implemented in whole or in part as a software program and/or a hardware device (e.g., ASIC, FPGA, processor, memory, storage and the like).

For purposes of illustration, FIG. 1 depicts an application server 106 as an entity separate and distinct from the identity server 108 and each server in independent communication with the network 110. It is to be understood, however, that the servers 106, 108 can also be implemented, for example, on a single server (e.g., as logically distinct modules), distributed on portions of several (i.e., more than two) servers, and/or as part of a single server node or server farm in communication with the network 110 through, for example, a single web server (not shown). It should further be understood that even if two logical servers are running in the same physical machine, they may be secured logically if any of the following conditions are met: (1) the servers run in different process spaces (so there is no possibility for one process to access the memory of another process); (2) the servers access different logical databases (which may be further partitioned) with different credential or entry requirements; (3) sensitive data in the application server 106 and the single-sign-on server 108 are encrypted using separate encryption keys; or (4) the server applications are launched (e.g., in a Unix environment) under two different logon accounts. For heightened security, some or all of the data used by the servers 106, 108 using a key maintained by the application server 106 or an external key server. This approach enhances security because a breach of the identity server 108 and its database 124 would yield only encrypted data.

The client 104 can be any computing device (e.g., a personal computer, set top box, wireless mobile phone, handheld device, personal digital assistant, kiosk, etc.) used to provide a user interface to access the application server 106. The client 104 includes one or more input/output devices 126 such as a keyboard, a mouse, a screen, a touch-pad, a biometric input device, and the like. The client 104 also includes an operating system 128. Operating systems supported by the client 104 can include any member of the WINDOWS family of operating systems from Microsoft Corporation. The client 104 may also include one or more client-resident applications 130, such as INTERNET EXPLORER developed by Microsoft Corporation, NETSCAPE NAVIGATOR offered by AOL Time Warner, FIREFOX developed by the Mozilla Foundation, or ATTACHMATE developed by Attachmate Corporation.

To use the system 100, a user U registers that user's authentication data for one or more applications with the application server 106. The authentication data can include, for example, a password, a user identification number, or biometric data associated with the individual's fingerprint(s), facial characteristics, voice, and the like. The system 100 stores authentication data identifying the user to the system (e.g., username, logon ID, employee ID, and the like) in the application database module 116. The application database module 116 may also associate an alias with that stored data. For example, employee #2054 may be associated with the alias 719jLL01. As the user logs into an application 114 (residing on the application server 106) via the network 110, a single-sign-on agent ("SSO agent") 132 residing on the client 104 captures the authentication data entered by the user U by means of one or more input devices 126 and transmits (or causes the transmission of) the authentication data to the single-sign-on web server module 122 residing on the identity server 108. The SSO agent 132 captures the data by, for example, monitoring a messaging queue for instructions sent to and from the operating system, intercepting HTTP requests sent to and from the network 110, capturing screen images sent to the output device(s) 126, or any other suitable method. The single-sign-on web server module 122 provides the authentication data to the application server module 120, which in turn stores the data in the identity data store 124. The single-sign-on application server module 120 then retrieves the updated authentication data and sends it to the client 104 using the web server module 122 and the SSO agent 132. The authentication data can be stored on the client 104 in the user profile 134 for future use by the SSO agent 132 residing on the client 104. Thereafter, as the user logs into an application in the usual fashion, the SSO agent 132 operates in the background, gathering and transmitting to the various application servers 106 all the information necessary to automate subsequent logons. By using an approach in which a client-resident software agent is inserted between a user's request to access a resource and the resource itself (e.g., a server, an application or even a physical location), the systems and applications being requested by the user are "unaware" of the additional criteria needed to gain access.

Alternatively, or in addition, the SSO agent 132 may reside on a server. This embodiment is particularly useful in a "thin-client" environment, such as CITRIX METAFRAME. In this embodiment, user U connects to a server where the single-sign-on agent 132 resides. This server, in turn, communicates with the application server 106 and identity server 108. The displayed output (such as HTML or screen dumps, for example) is obtained indirectly from the application server 106, by way of the server on which the SSO agent 132 resides; that is, this additional server runs the SSO agent 132 and passes back the display information (as pixel values, markup code, or any other suitable display modality) to the client 104.

The user profile 134 can contain various data furthering the function of the invention, such as a user identification code; an authentication modality (such as password, biometric data, or the like); an application profile (such as a user's rights and privileges within an application); an application credential for access (such as a user's password, a digital representation of biometric data, or the like); and/or audit records of a user's activities within an application. The SSO agent 132 can then use the data stored in the user profile 134 to determine which HTTP requests to intercept, to complete logon screens with stored authentication data, and the like.

In the illustrated embodiment, there are security measures that the system 100 can use to ensure that a listening device does not capture this authentication data, or if the data is captured, that it is not usable by itself. For example, the SSO agent 132 can encrypt the alias and the biometric data independently, the SSO agent 132 and the identity store 124 can communicate with each other using SSL and/or public and private keys, and/or the SSO agent 132 can transmit the alias and the authentication data independently to the identity data store 124.

The registration process can be initiated in several different ways. In some cases, the responsible technology administrator initiates the registration. For example, the administrator can have the user come to the administrator's client 104 or to a secure client 104 used only for registration when the employee starts work, when a customer purchases services accessible via the application server 106, and the like. Alternatively, the application server 106 can initiate registration when the user first requests a service from the application server 106 requiring user authentication. The client 104 can display a graphical user interface ("GUI") leading the user through the registration process. The level of authentication of the user at registration may be selected by the administrators of the system 100 and can range, for example, from a user presenting the correct password to the application server 106 to a user being present in person in front of an administrator who can check the user's identification.

Once the system 100 registers an individual, the single-sign-on application server module 120 creates an association between the data identifying the user to the single-sign-on system and the user's alias in the application database 116, and another association between the user's alias and the user's authentication data in the identity data store 124. Storing the two associations at locations separate from each other prevents identity theft absent a breach in security of both the application database 116 and the single-sign-on database 124; only then could authentication data be combined with some identifying data. For example, the first association may be stored in the application database module 116 residing on one physical server, while the second association may be stored in the identity data store 124, residing on a second physical server. Further, if the identifying data is just another unique identifier that does not reveal identity by itself, for example an employee number, then the security of a third database (not shown) containing the association between the employee number and the identity (e.g., name and address of the employee) would have to be breached to match the identity of the user with that individual's biometric data.

With an individual registered in the identity server 108 (i.e., with user-identifying information, an alias, and authentication information obtained and stored in the identity data store 124), a user may be authenticated to one or more applications without having to provide authentication information for the application(s) each time she requests access. The user U of the client 104 logs into the single-sign-on server 108 by providing one or more of a password, user identification code, biometric data, or the like. The identity server 108 authenticates the user based on the information provided and retrieves the user profile 134 associated with the user U from the identity data store 124, and sends the user profile 134 to the client 104, thereby allowing the SSO agent 132 to control access to individual applications.

For fingerprint-based biometric authentication, for example, the SSO agent captures the fingerprint minutiae from the scanner; for password authentication, the SSO agent 132 presents a dialog on the screen to capture either a static password or a one-time password from a token. Verification of the information is handled by the identity server 108, which can interact with other authentication servers such as Active Directory, a biometric identification server, a RADIUS server 310 for token authentication (running in a LINUX or WINDOWS environment), a KERBEROS server for smartcard logon, or a physical access server for proximity-based card verification. Any number of supporting authentication servers can be included in the authentication policy; the specifics of how each access system evaluates a factor is left to that system. The identity server 108 receives a go/no go decision in response to its request to the various access systems and, depending on the combined results obtained from the authentication servers of each system, sends either the user's network credentials (when the policy is fulfilled) or an error message indicating the authentication could not be completed (because the policy is not fulfilled) to the SSO agent 132 on the client 104. Upon receipt of the user's credentials, the SSO agent 132 logs the user into the secure resource.

Similar to the security measures described above for accessing logical resources, physical access control systems ("PACSs") are often used to manage access to physical resources such as buildings and/or rooms. PACSs may be used, for example to administer access to a laboratory containing highly-sensitive and/or dangerous materials, financial data, expensive equipment, inventory or even an entire building.

Figure 2:
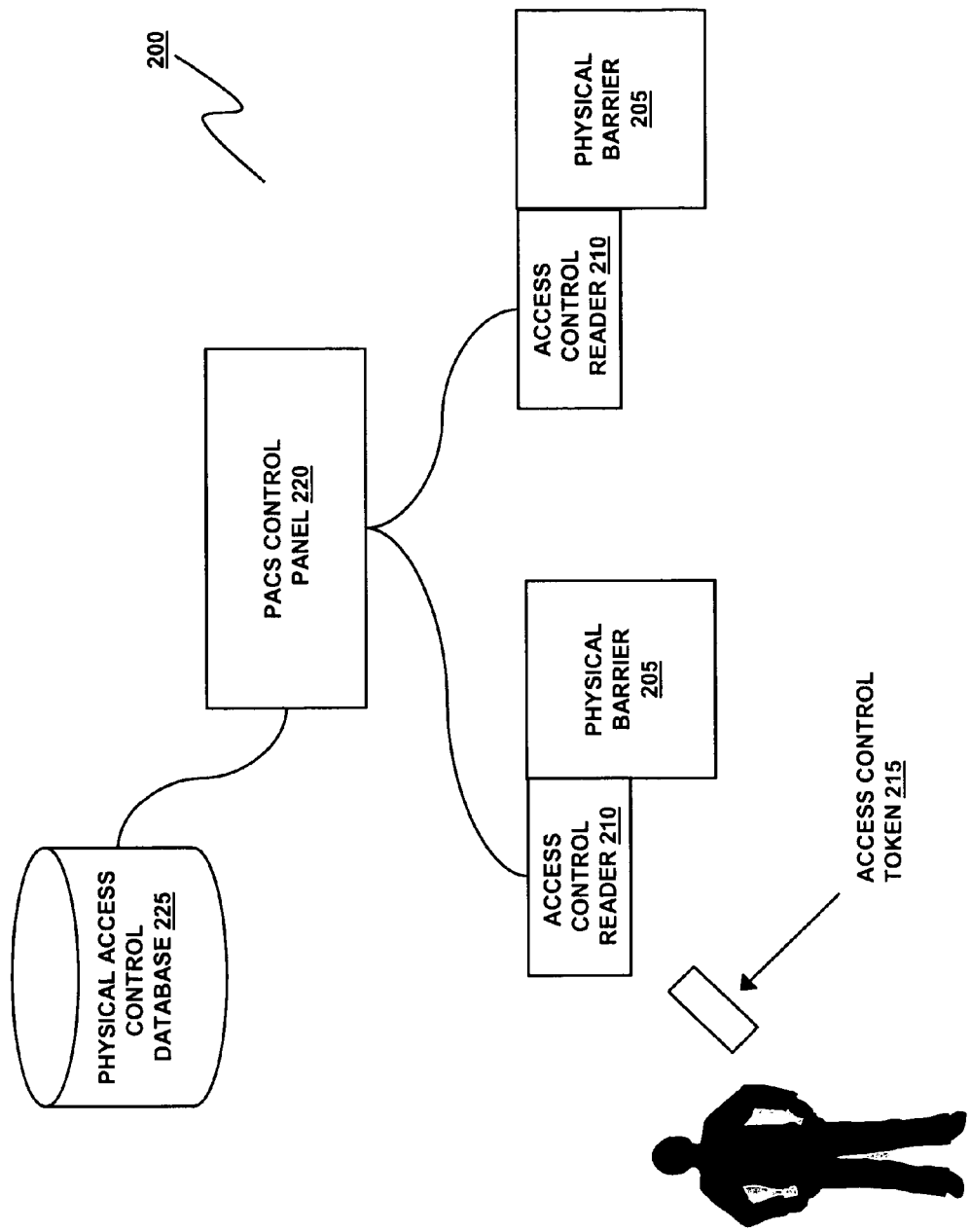
FIG. 2 is a block diagram of a physical access system adapted to practice various embodiments of the invention.

Referring to FIG. 2, one exemplary implementation 200 of a PACS uses proximity card readers and a centralized control panel to secure entries and/or exits from secure environments. Various physical barriers 205 (e.g., doors, locks, gates, corridors, elevators etc.) that provide passage to secure environments are equipped with one or more readers 210. When an individual approaches a particular reader 210, he presents an access-control token 215 as his authentication credential. The reader 210 then transmits information extracted from the token 215 to an access-control panel 220. The control panel 220 queries a PACS control database 225 using a unique control number extracted from the token 215, and if the results of the query indicate that the token 215 is valid, the physical barrier 205 is unlocked, opened, or otherwise removed and the individual can enter.

One common form of reader/token combination is the proximity card reader, in which the token 215 is passed through a radio field created by the reader 210 and information on the card is detected and transmitted to the control panel 220 using, for example, the Wiegand protocol. Other card reader systems include touch-plate, magnetic common code, magnetic stripe, and barcode. In some instances, the reader 210 may require additional information from the individual prior to authentication. For example, the reader may be augmented with a keypad at which the individual is required to enter a pass code in addition to (or in some cases instead of) presenting the token 215.

Biometric authentication may also be used to authenticate individuals and grant access to secure locations, in which cases the reader 210 may be or include a biometric scanner. To gain access, an individual presents one or more biometric credentials (e.g., a fingerprint, voice, retinal scan, face scan, DNA sample, etc.) to the reader 210, which the creates a digitized representation of the credential. The digitized credential is then forwarded to the control panel 220 for comparison with a reference credential to determine if the individual is authorized to enter the secured area.

As described above with reference to FIGS. 1 and 2, the identity server 108 compiles, stores and manages access policies relating to securing logical resources, and the PACS 200 performs similar functions for physical resources. By combining information (both static rule-based data as well as dynamic state data) from the two in a manner as described herein, greater security and auditing capabilities can be realized without the need for excessive customization or large-scale development.

Techniques and systems in accordance with the invention use data from multiple authentication modalities to implement global access-control policies across an organization, or in some instances, across multiple organizations. Generally, the policies are based on individual rules that may be applied at the user/resource level, and can be combined (using, for example, Boolean logic and/or forward-chaining techniques) in such a manner as to define a complete access-control policy for an individual (or group of individuals) at a given time. As an example, a policy can specify that all users, regardless of connection type, must be authenticated using a finger biometric, but then also must supply a proximity card for access to a building. In contrast, a remote user, while still required to supply a biometric credential, is only granted access if a proximity card has not been presented, indicating the user is in fact attempting to log in from a remote location. Policies governing access to certain resources (e.g., human resources databases, payroll, healthcare data, etc.) may require additional authentication and/or the existence or non-existence of certain environmental variables. As an example, a benefits worker requesting access to a payroll database may be asked to provide a biometric credential, but even if the credential is authenticated, access may be denied unless she has also recently presented an encoded identification card to a card reader in close proximity to one of a defined set of workstations during normal business hours. With each of these individual rules satisfied, it is highly likely that the benefits worker is an authorized user and accessing the data from a secure location. In some instances, a user's policy may include rules based on other user's authentication criteria. Continuing with the benefits worker described above, one rule of her access policy may indicate that if she requests access to an employee review database, not only does she need to provide her own authentication credentials, but those of her supervisor as well.

In some cases, access policies may be based on meeting a threshold certainty value and may be satisfied when some subset of the rules are met. For example, an access policy may indicate that access is to be granted if there is at least a 98% likelihood that the user requesting access is in fact an authorized user based on individual probability weights assigned to each rule. For example, because biometric credentials are relatively difficult to imitate, a valid biometric credential may contribute significantly to meeting a likelihood threshold, whereas a user ID is relatively easy to misappropriate, and may thus contribute only marginally. Other factors, such as logging in from a remote connection using a VPN, may actually reduce the probability—even if valid credentials are presented. For example, presentation of a valid user ID and password along with an approved physical token may translate into a 99% likelihood of authenticity, exceeding the 98% threshold. However, if the request is received remotely, the certainly level may actually decrease to 70%, in which case a valid biometric credential must be presented to meet the threshold. The policy may also include individual rules related to different types of biometric authentication, password presentation, time-of-day, day-of-week, concurrent application usage and physical location restrictions.

Depending on the policy in effect, the SSO agent 132 and the authentication server 108 can either both participate in adjudicating the decision granting or denying access (e.g., when the client is connected to the identity server 108), or the decision can be made exclusively by the agent when the user is offline.

Figure 3:
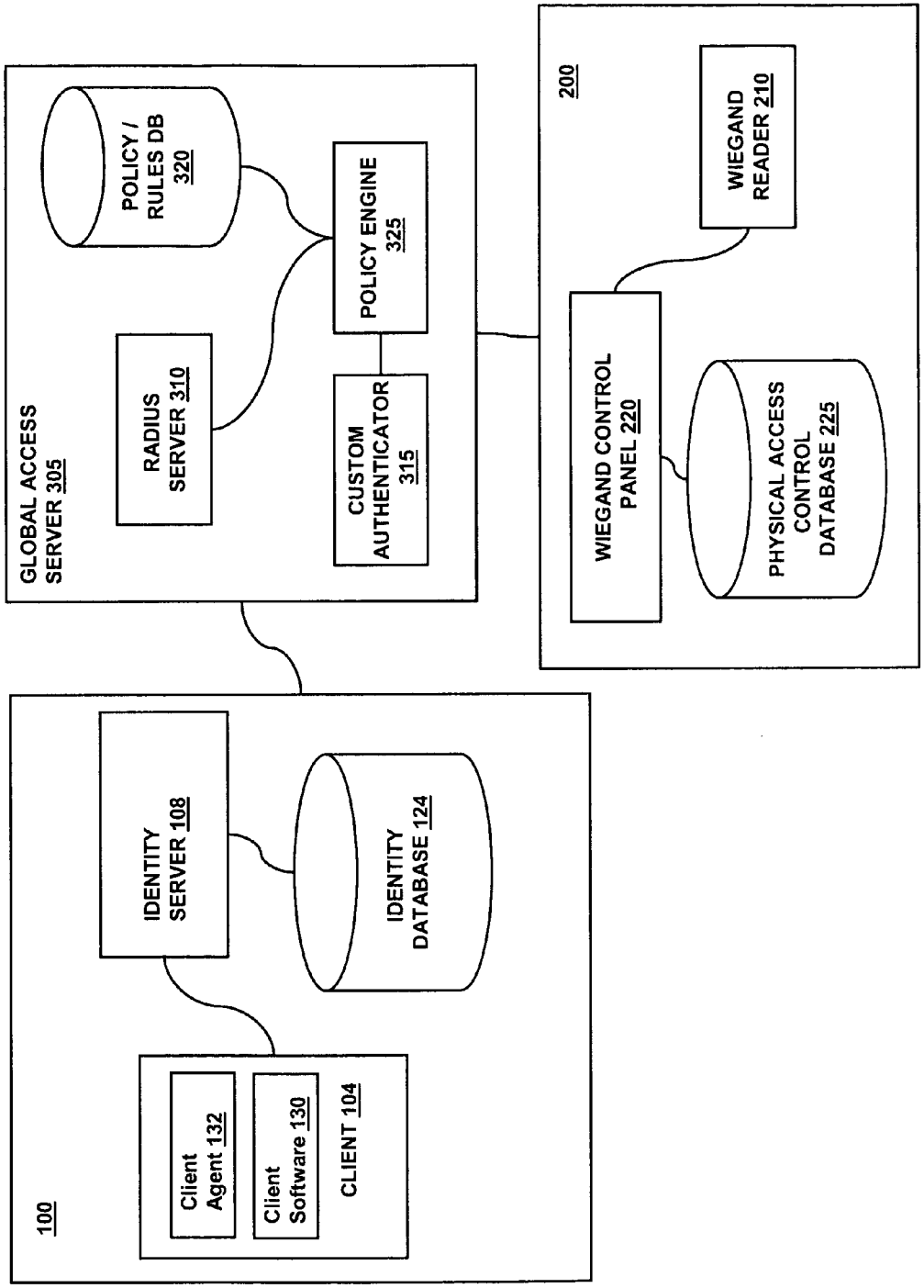
FIG. 3 is a block diagram of a global access system adapted to practice various embodiments of the invention.

Referring to FIG. 3, a global access server 305 provides a secure connection between the authentication server 108 and the PACS 200(and, if desired, other access control systems) by offering a trusted protocol that supports exchange of authentication and accounting information between the two disparate systems without having to initiate a trust model to either party. By using an extensible protocol, additional messages can be exchanged between the two systems, although only authentication and accounting information need to be exchanged to implement the rules-based authentication process described herein. In some embodiments, the identity server 108, the global access server 305 and an associated RADIUS server 310 can be hosted on the same physical server, whereas in some cases the servers reside on separate physical devices and interface with each other using conventional networking modalities.

As described above, the system's ability to use external authentication authorities also includes authentication through physical access systems such that location-based information can be used for network authentication. In one implementation, an authentication policy requiring strong authentication with a one-time-password (OTP) token (such as the SECUREID system marketed by RSA SECURITY SYSTEMS) directs the identity server 108 to pass the OTP (entered in a standard or custom logon form, for example) to the RADIUS server 310 for verification. The accept/reject decision from the RADIUS server determines whether the user is granted access to the network.

In contrast, with a "back end" server approach that requires multiple adapters (to the WINDOWS ACTIVE DIRECTORY, RADIUS, and each secured application, for example) to control a user's access rights to the resources, no data is changed or added to the servers supporting the access control systems. If a user's request to logon to WINDOWS is denied based on rules in access systems other than Active Directory, for example, the identity server 108 informs the SSO agent 132 that the user's access policy have not been fulfilled, and access is denied—even if the user provided the necessary credentials according to the rules in the Active Directory server. As a result, the multiple rules that constitute a user's access policy, and which may be stored in various heterogeneous access control systems, can be collectively used to manage a user's access to WINDOWS without having to change data in the Active Directory server or making any changes to the WINDOWS code. Similarly, if a user's request to logon to a virtual private network (VPN) server is to be denied based on a policy that includes rules from a physical access system (e.g., the user cannot use VPN from within the building), the request is intercepted before it reaches the RADIUS server, and user access is denied without changing user-specific data in the RADIUS server.

This approach eliminates the need for a centralized server for storing event data related to various access-control systems. Instead, the access-control decisions are driven by a coordinated identity-authentication process acting automatically on access rules existing in or governing other systems, which are combined into a global access policy. This noninvasive approach can thus be layered onto existing infrastructures without implementing custom software modules that require intercommunication among the various components or a common data-interchange format. It also allows the routing and management of access-related events to be addressed in a distributed manner, obviating the need to rely on a single point to coordinate, route and manage the flow of events to and from the various access systems.

The present invention also allows the multi-factor authentication to operate in remote-access mode. Initially, an administrator specifies one or more RADIUS servers that can be used to interface with the PACS by providing one or more of a port, a server name and/or a shared secret. In addition, the administrator can specify whether a user's remote network access requires authentication against the PACS in addition to other forms of authentication, such as biometric credentials, a token key or a password.

The SSO system uses the industry standard RADIUS protocol for authenticating users against external authentication authorities such as SecureID or VacMan, marketed by VASCO SECURITY SYSTEMS. The RADIUS protocol is commonly used for providing access to secure applications (e.g., access to a VPN) and uses a trust model that relies on a shared secret between the RADIUS client and server. To initiate trust between the identity server 108 and the RADIUS server 310, the shared secret can be entered by the administrator and used by the identity server 108 to communicate (as a RADIUS Client) with the RADIUS sever 310. As a result, the identity server 108 can pass RADIUS authentication information (such as a one-time-password, or OTP) from the user, through the VPN client, to the VPN server, and on to one or more authenticating RADIUS servers 310, thus providing strong authentication for network access from a remote client.

The global access server also provides a generic framework for inclusion of one or more custom authenticators 315 responsible for translating usernames and badge ID requests to the PACS via one or more authentication interfaces using, for example, APIs or XML (e.g., using web services). The authentication interfaces can be designed to suit the individual interface for each PACS, and maintain responsibility for the setup and teardown of each authentication request and response, as well as generating the actual request generated by the identification server.

Conventional PACS include proprietary interfaces (API or XML), and therefore the invention provides an authentication interface on the RADIUS server 310 that includes instructions for servicing the requests from the RADIUS server 310 to the PACS, using APIs and/or messages native to the PACS. In one embodiment, a Java-based RADIUS server framework is used (such as that provided by AXL Systems, for example) and the authenticator code can be implemented in Java as a authenticator class that derives from a base class AccessImpl using the authenticate() method. When a RADIUS request is to be serviced, the authenticate() method is called with an AuthInfo object that includes relevant information about the request. Methods within the AuthInfo class provide methods for authentication, accounting, and logging. If the external PACS communicates over HTTPS and XML, the authenticate method formats and sends the message and waits for the response. A call to setAccessAccept()returns a positive response back to the identity server. If an API is used, a JNDI layer translates calls from Java to the native platform (and vice versa).

Each interaction between the global access server 305 and external authentication servers evaluates at least one factor (or "rule") of a multi-factor authentication policy by asking the external server whether the user name and/or some set of user-provided authentication credentials satisfy authentication rules specific to that server or other secure resource. Each rule is evaluated based on one or more criteria such as user-states according to a logical or physical resource (e.g., logged in, remote, badged in) and/or environmental states (e.g., off-hours, weekend, high alert, etc.). As each user-state and/or environmental state us presented at the global access server, the policy engine adjudicates the access request by determining which, if any, rules are satisfied and if the results are sufficient (either in number or probability) to meet the overall policy.

For example, a biometric authentication request might contain a user's ID, a biometric template, a policy regarding the goodness of fit or minimum number of matching minutiae points, and a maximum angle of rotation. The biometric server responds with a "yes" or "no" based on the degree of match between the provided template and a set of reference templates. The same approach may be used for physical access authentication in which a user's ID, badge ID, a criterion for elapsed time since the user was last authenticated, and the door through which the user passed can be used to determine if the user is within a specific zone. The policies and rules can, for example, be stored in a policy/rules database 320 and evaluated by a policy engine 325.

In some embodiments, the interactions between the global access server 305 and external authentication systems act as stateless queries that do not require the global access server 305 to relay state information or to exchange notification messages between servers. Thus, the global access server 305 is not required to act as an aggregator of real-time events from different servers. The system-specific event data can therefore be stored locally (i.e., within the servers attributed to each access control system) and any sensitive information associated with such event data remains at the local machine, thus avoiding transmission of sensitive data. Unlike conventional approaches where a master server serves as a "sink" for all real-time events from each access-control system deployed throughout the network, the stateless nature of the identity server 108 and global access server 305 permits scalability not feasible in other systems because it can be easily replicated over a network to handle large numbers of SSO agents and RADIUS gateways. More importantly, neither server is a single point of failure or bottleneck for network and remote access authentication requests that employ multi-factor authentication.

Furthermore, using the standard RADIUS protocol allows the system to take advantage of an established security model; the extensible nature of the RADIUS protocol allows user accounting information to be passed between the SSO system and the PACS system; and the user-authentication interface can control VPN remote access as well.

Figure 4:
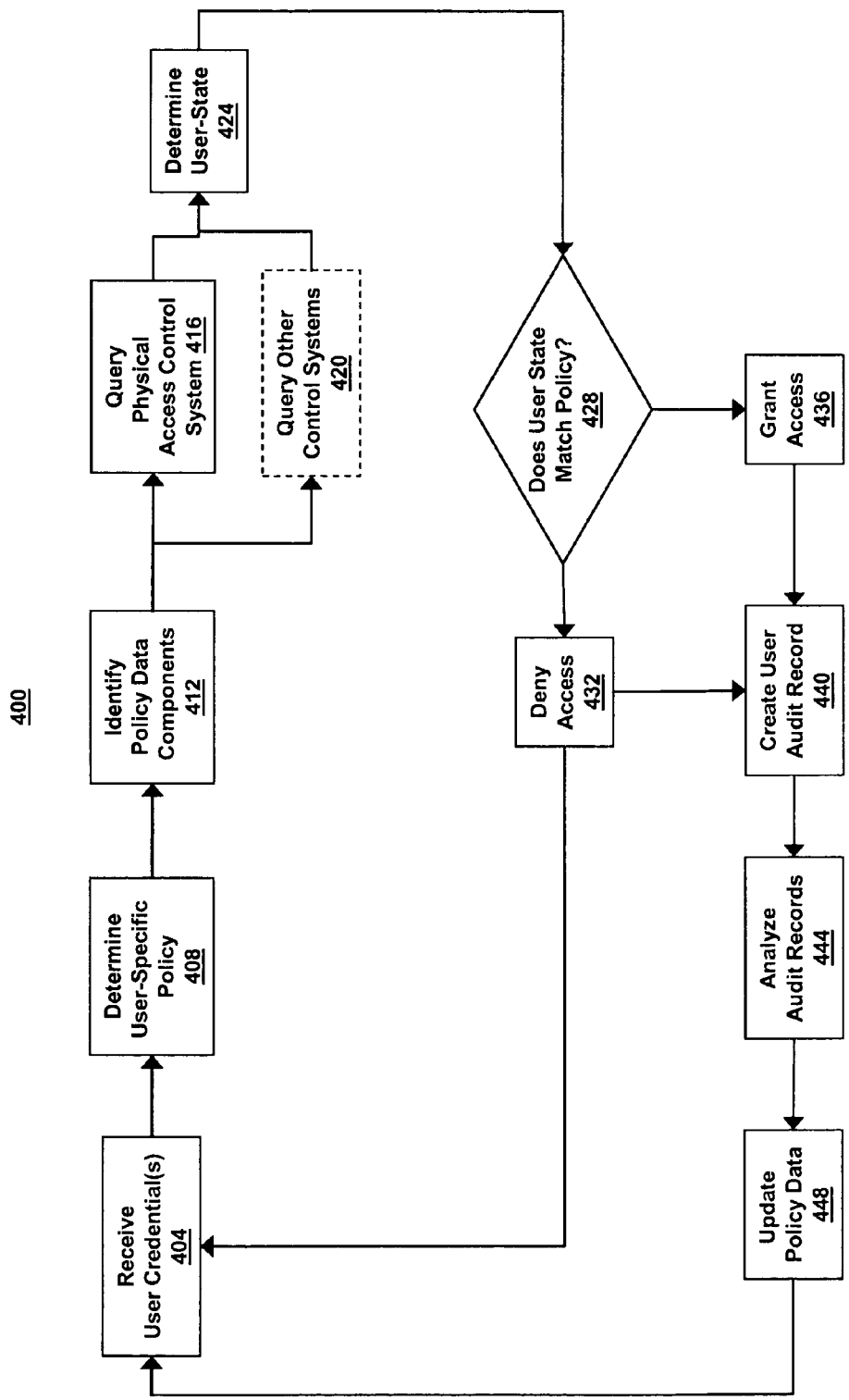
FIG. 4 is a flow diagram illustrating the process for providing automated access and user authentication according to one embodiment of the present invention.

Referring to FIG. 4, in one exemplary a process 400 for providing users with access to a secure computer system, a user initiates a logon session by, for example, turning on a workstation, unlocking a workstation, connecting to a remote access server, or some other event. The client-resident SSO agent recognizes the logon screen that is presented to the user (usually a form with one or more data-entry fields for authentication), and intercepts the credentials entered by the user into the form. Various examples of how the SSO agent recognizes login events are described in currently pending, co-owned U.S. patent application Ser. No. 11/392,233 entitled "METHODS AND SYSTEMS FOR PROVIDING RESPONSES TO SOFTWARE COMMANDS," the entire disclosure of which is incorporated herein by reference.

The logon request and associated credentials generated by the SSO agent are received at the identity server (STEP 404). The identity server queries the identity database to determine the current access policy (STEP 408) based on data provided by the SSO agent such as a user ID, time of day, type of resource requested, attributes of the requesting device (e.g., IP address, MAC address, incoming port, etc.) and which individual rules (or which combinations of rules) must be met to satisfy the policy (STEP 412). If the authentication policy calls for physical authentication (against, for example, the PACS system), the identity server queries the PACS system (STEP 416) by, for example, posting a RADIUS authentication request containing the username and the badge ID to the global access server, which in turn, queries the PACS via the authentication interface (described above). The PCAS then executes its internal authentication process with the data provided by the global access server and returns a "state." In this regard, data residing in the PACS need not be formatted, replicated or shared with the global access server. In some embodiments in which the data components include supplemental user or environmental state information not stored in the identity server or the PACS system, additional control systems (e.g., emergency systems, operational readiness systems, etc.) can be queried (STEP 420) using similar authentication interfaces configured for each system.

Based on some or all of the responses received from each of the various access-control systems, the user's overall authentication state (e.g., active remote user, inactive user for an application present in a secure room, etc.) is determined (STEP 424) and based on the users state and how it meets or does not meet the access policy, a decision can be made whether to grant or deny access to the requested resource (STEP 428). If the policy is not met, the user is denied access (STEP 432) and may be prompted to provide additional criteria (e.g., a biometric credential, token) or to present a physical authentication device to the PACS in an attempt to increase the likelihood that the individual is an authorized user.

The accept/reject response from the global access server controls whether the SSO agent proceeds (e.g., by requesting that the user provide additional authentication modalities, such as a password, fingerprint, and/or smartcard), or terminates the request because the access policy set on the PACS has denied logical access to the user. In some implementations, the decisions made by the PACS have precedence over all other authentication modalities, whereas in other implementations rules stored in (or associated with) the PACS may merely provide one factor in determining access.

For example, in addition to a user providing a user ID and password when requesting access to a secure resource, if the policy regarding the user (or resource, or both) also requires that he be on the premises, the identity server may initiate a request to the PACS inquiring whether the user's badge has recently been presented at a specific reader that secures access to the workstation. Other rules and policies can include time-based rules (e.g., multiple criteria required during non-business hours), workflow-based rules (e.g., different policies for different applications or portions thereof) as well as combinations of rules.

Once a user successfully authenticates to the system (through the SSO agent), he is granted access (STEP 436) and individual user audit records can be created (STEP 440). In some embodiments, audit records may also be created based on failed authentication requests, providing additional insights into who may be attempting to gain access to secure resources, as well as when and from where the requests are emanating. This "accounting information" can be captured on the identity server, and may include data such as the domain to which the user logged in, the authentication means used, a workstation ID, a workstation IP or a MAC address.

In some instances, the audit records created by user authentication requests and the subsequent granting or denial of access can be analyzed (STEP 444) to determine trends, flaws in access policies, potentially new threats and other valuable information. For example, if repeated remote access requests emanate from particular IP addresses during normal business hours and these initially result in access being granted based on presentation of a security token, but are later denied based on the user's inability to present valid biometric credentials, the access policies can be updated (STEP 448) such that any requests received from those IP addresses are immediately blocked. Furthermore, access requests that have a high likelihood of being malicious (e.g., off-hour requests using outdated user IDs or repeated attempts from a series of IP addresses using a common MAC address, multiple denied authentication requests from a single workstation in a secure area during off-hours, etc.) can generate alerts in an attempt to provide an early warning signal to system administrators of such attacks.

The identity server can also be used to signal the SSO agent if the user is no longer allowed access to the logical system. This can be useful in situations where access to the computer systems and related infrastructure have been disabled prior to disabling the user's physical access in the PACS. For example, if the identity server determines that a user is no longer allowed access to the network (or certain network resources), it can send the badge information to the PACS control panel, effectively blocking any requests for physical access using that card. This is analogous to having a reader that disables the user's access privileges once a card is presented. Termination of the user's access privileges can be set for one or more sub-regions (i.e., zones) within the system, such that the card may continue to operate for obtaining access to certain areas, but not others. The policies for determining which "zones" are affected by such events can be stored in a database on the identity server, within the physical access system, or in another system to which the SSO server has access. Similarly, when an individual's physical access privileges are revoked, the global access server can provide notification of a change in his status to the identity server, which in turn an update the SSO agent, thus blocking any access to logical systems, even before the application-specific user permissions are updated through conventional procedures.

In another embodiment, the invention facilitates capturing and storing associations between the users' SSO usernames (i.e., the usernames employed for primary authentication of the users to the SSO system) and one or more badge IDs that can be presented on behalf of the users. Because badge IDs can serve as a token for a user requesting access through the SSO system, the identity server manages the relationships between usernames and one or more badge IDs. As described above, the authentication policies associated with the user and stored on the identity server determine whether authentication requires the SSO server to verify any additional data or apply additional rules from an external authentication authority, and whether to present one or more badge IDs or static credentials.

In some cases, users can have multiple badges, each representing a unique sequence of characters that can be exchanged with the PACS during user authentication. While there are differences in the number of bits and format of the badge information, they are managed internally as a byte array. Badge IDs can be either entered manually or using an attached card reader (PCProx-USB) that allows the SSO agent to read the site and user code directly from the card using either a self-enrollment or supervised enrollment model. In self-enrollment, the SSO agent on the desktop asks if the user wants to enroll a new card if the presented card (using the PCProx reader) is not already associated with the user. The SSO agent and server associates the badge ID with a user and uses the data as a token when making authentication requests against the PACS.

In some implementations, individuals may work in or have access to multiple controlled-access environments (often having no relation to each other) and therefore will often have authentication credentials for accessing each of the different logical and physical resources within those environments. For example, people carry different keys for accessing vehicles, deposit boxes, doors, drawers, cabinets, lockers, offices, etc. In most situations, a person's ability to select the correct key for a particular resource is based on her ability to either remember or deduce the proper one. In situations where similar keys are used, trial and error or guessing may be required. Similarly, in a converged logical and physical access system, an individual may have multiple credentials such as physical access cards, smartcards, one-time password (OTP) tokens, PKI certificates or biometric templates (for different fingers or different systems)—each for gaining access to a different system.

In general, a credential is only valid for the particular resource for which it was issued. For example, a physical access card issued for providing access to a building functions only within that building. This trust model assumes a one-to-one relationship between the issuer (e.g., the building) and the requestor (e.g., the cardholder) in which the requestor is granted access once the issuer verifies the authenticity of the credential. The present invention, however, expands this trust model for accessing a resource by allowing validated credentials issued by other constituencies or organizations (e.g., a government, another company, etc.) to be trusted, resulting in authentication policies that are more flexible and inherently more secure.

As an example, a network access policy may dictate that a user be granted access to the network only when verified using a government issued ID (e.g., a healthcare professional ID card, a military ID card, etc.) and also a confirmation of physical presence based on authentication by a PACS using a proximity card. This expanded trust model allows credentials to be used collectively to confirm access rights to computing resources such as a network, secure applications, or a VPN. This approach can also be applied to SSO applications, wherein the ability to access a secure resource and use applications on the resource can be predicated on satisfying a policy that depends on one or more validated physical access credentials.

A strict access policy may specify, for example, that a user can only log on to a computer located in a secure zone if he has previously presented a first credential at the outer perimeter of the building, and presented a second credential at the entrance to the secure zone. In cases where the two credentials are issued by two different constituencies (e.g., a university and a company carrying out research within a university building), the ability to execute complex policy decisions may require a "broker" that recognizes the different credentials associated with the user, applies the complex policy against the credentials, and collects information from multiple authentication servers to make the final access decision. A constituency, in this context, can be any organization or group within an organization (e.g., a department within an enterprise). In some cases, a constituency can span organizational boundaries—such as a licensing body that issues IDs for workers employed by different companies.

By expanding the trust model for a resource beyond a simple one-to-one relationship between the resource and its users to a one-to-many relationship between the user and the constituencies from which he receives authentication credentials, the invention facilitates the implementation of complex, cross-organizational authentication policies. In such implementations, each authentication credential can be assumed to have its own trust model between the issuer (typically the entity that controls the secure resource and/or environment) and the credential holder. The global access server tracks and stores the relationships between a user's identity and the numerous credentials she uses for authentication against logical and/or physical access systems—including ones that extend the trust model beyond her organization's boundary (however defined). The global access server authenticates the user against different security policies by providing the authentication credentials associated with the user and presenting the credentials to the appropriate constituencies for verification. The ability to automatically store, identify, retrieve and submit different authentication credentials on behalf of a user relieves the user from the responsibility for maintaining and knowing which credentials to present and how they should be combined, yet provides a robust security policy based on converged authentication credentials. Examples of authentication credentials that can be stored by the identity server include network logon/passwords for network domains, logon/password for remote access servers, biometric data for different modalities, serial numbers of OTP tokens, badge IDs used for physical access, badge card formats (such as Wiegand 26 bit or Wiegand 36 bit), the particular facility badge cards are associated with, personal identification number(s) (PIN) associated with contactless smartcards or magnetic swipe cards, badge IDs for active proximity cards, public key infrastructure (PKI) certificates issued to users, and/or identities associated with cards issued by government and/or external entities.

The global access server authenticates users with converged authentication credentials by "brokering" the authentication process among numerous disparate systems, each potentially having unique authentication procedures. The brokering process identifies and applies the policy for the particular resource (i.e., domain) against the access policy (or policies) assigned to the user as described above, evaluates them rule by rule, and aggregates the results. Access to the resource is granted based on meeting the requirements of the policy—e.g., when some minimum number or all the requirements of the policy are met or some likelihood threshold is achieved. Because the authentication credentials can potentially be issued and verified by different constituencies, the authentication server establishes and manages the transitive trust relations among the constituencies.

For example, a hospital may trust an identity established by a government-issued ID card for doctors as sufficient to permit the doctor to log in to the hospital's network. Another hospital, however, may choose to trust the government-issued ID card for authentication, but may supplement that authentication by checking its PACS server to confirm a recent presentation of a valid proximity card.

The authentication server can maintain multiple sets of authentication credentials as well as the rules that define how to evaluate each credential and how they collectively contribute to an overall access policy for each user. For each credential there is an implicit association with the issuing server or service that can be used to verify the credential(s), the constituency that issued it, and other constituencies that may elect to use such credentials as part of their own authentication policy. Such relationships can be modeled as a cross-reference matrix describing whether a credential is "trusted" by another constituency, and how it is used in connection with a particular authentication or access policy. The trust matrix allows the authentication server to determine which of several authentication credentials need to be evaluated (and met) for a particular user and, if necessary, the sequence in which they should be evaluated.

For example, Table 1 below illustrates such a matrix for a doctor who works at Hospital 1, but has roaming privileges at Hospital 2 and Hospital 3:

stituencies) can then be combined into a more complex authentication policy depending on the access requested (e.g., Log in to Hospital 2 Network, Log in to Hospital 1 via VPN, etc.). To log on to Hospital 1, for example, the authentication server checks Hospital 1's PACS with the doctor's H1 Facility badge as well as the credentials presented from the government issued smartcard. On successful verification of both credentials, the doctor's network login credentials are automatically submitted to log the doctor in. If the doctor requests access to Hospital 3's network, however, the system checks Hospital 3's PACS, the government issued ID, and the doctor's network password.

While this example illustrates handling of credentials issued by three separate organizations, the invention can also facilitate spanning multiple network domains within one enterprise.

The mapping between the user and her credentials can be obtained through a self-enrollment process or a semi-automatic discovery process. In a self-enrollment process, the user enters her assigned credentials into an enrolment form (e.g., a web-based HTML form) and the authentication system verifies each credential by querying each issuing entity. An automated credential discovery process can also be used (especially in implementations involving a large number of users and/or issuing entities) to determine correlations among user identity attributes (e.g., name, employee ID, telephone number, gender, address, system usage profile, biometric identifiers, etc.) for individuals known by the authentication server to consolidate multiple user records into a single record for an individual. Likewise, various credential issuers (such as a PACS) can discover correlations among identity attributes. In cases where mismatches arise (due, for example, to data entry errors or incorrect or out of date information), adjudication of discrepancies can be performed manually. Furthermore, because a user's authentication credentials can change over time (e.g., issuance of a new token, a new proximity badge, updated user ID, etc.) it may in some cases be necessary to synchronize and verify the data on a periodic basis to prevent authentication errors.

In cases where a user has multiple access cards, the invention allows the selection of the proper authentication creden-

TABLE 1

Exemplary User Credential Policy

| Credential Type | Issued by | Login to Hospital 1 Network | Login to Hospital 1 VPN | Login to Hospital 2 Network | Login to Hospital 3 Network |
| --- | --- | --- | --- | --- | --- |
| H1 Network Login Credentials | Hospital 1 | Auto submit | | | |
| H1 VPN Login Credentials | Hospital 1 | | ✓ | | |
| H1 Facility Badge ID | Hospital 1 | ✓ | ✓ | | |
| H2 Network Login Credentials | Hospital 2 | | | Auto submit | |
| H2 Facility Badge ID | Hospital 2 | | | ✓ | |
| H3 Network Login Credentials | Hospital 3 | | | | ✓ |
| H3 Facility Badge ID | Hospital 3 | | | | ✓ |
| Government Smart Card | Health Dept | ✓ | | ✓ | ✓ |

The table shows the doctor as having eight credentials issued by four different constituencies: Hospital 1, Hospital 2, Hospital 3 and a nationally issued card. Different individual authentication requirements (some from other contial to use (and which server to authenticate against) in order to verify the user for a particular purpose. In some embodiments, the system provides the ability to rank and/or weight the importance of different credentials, further improving the flexibility of the authentication policy. For example, an authentication policy requiring the presentation of three credentials to three different verification systems is dependent upon each system being operational simultaneously. By allowing multiple, alternative paths to authentication, the inoperability of one system may be overcome by presentation of alternate credentials to one or more other systems on a temporary basis.

By using a separate server with a constituency-independent database to manage multiple sets of user credentials, the invention can establish and manage trust relationships among multiple different domains or constituencies. The ability of the authentication server to expand the typical one-to-one trust model allows alternative credentials to be used in place of, or to complement an organization's normal authentication requirements. The richness of the policy that can be built using this model provides users and administrators greater flexibility in controlling computing resources.

The invention also facilitates the accurate tracking of personnel throughout an organization with respect to both physical and logical resources. In addition to providing security against intruders, PACS are also used to provide an accounting of all personnel within a building—i.e., to produce a "muster list." If accurate, such a list can be valuable to emergency responders by providing the locations and numbers of personnel in a building. However, an exact accounting of personnel using conventional PACS is difficult without strict badge-in/badge-out policies and turnstiles, man-traps or other gating mechanisms that assure personnel do not bypass the system. Examples of common behaviors that result in inaccurate accounting include tailgating (an individual following closely behind another and gaining access without a badge), leaving a badge on a reader for a subsequent user to use, and "borrowing," where a user lends his badge to another individual. In addition, some buildings use "temporary" badges that may be assigned to contractors or in some cases employees who have forgotten their badges that day. Often these badges are not attributed to any particular individual, and thus while the presentation of such a badge authenticates the holder as a valid user, it does not identify that user by name.

The need to provide an accurate accounting of a personnel within a building without having to substantially change the infrastructure or inconvenience personnel has resulted in combining PACSs with "anti-pass-back rules" that force users to badge-in and badge-out at each entry and egress from the monitored environment. Such rules impose an access policy based on the current "state" the system believes the user is in—i.e., in the building, not in the building, or in some cases, unknown. For example, a user would be denied entry into a facility if records in the system indicated the user was in the building, possibly because she previously exited without presenting a badge. Similarly, a user may be restricted from exiting a building (except for emergencies) because recent records indicate that she never entered the building with the appropriate credentials (e.g., as a tailgater).

However, combining logical access systems with PACSs provides a mechanism to more accurately account for personnel without the additional restrictions or entry/exit devices described above. By monitoring user logon events (direct network access, VPN, wireless access, and web server/portal access), the network authentication server can combine logon information obtained from authentication agents on each user's desktop or workstation with information obtained from RADIUS proxy servers to update the physical access system with the location of the user.

A set of logic rules can be applied by the global access server to automatically update the "user state" based on recognized events (or lack thereof). For example, the global access server can determine that a user is inside the building (regardless of the state of the PACS) based on a valid login event from a computer located within the building. Similarly, the global access server can determine that a user is outside the building (again, even if the PACS records indicated a recent building entry and no associated exit) if the user requesting VPN or web server access is authenticated to the network by a RADIUS proxy server. Using a computer-to-Wiegand interface, the authentication server updates the PACS by effecting a badge event emulating the presentation of a badge at card reader.

Figure 5:
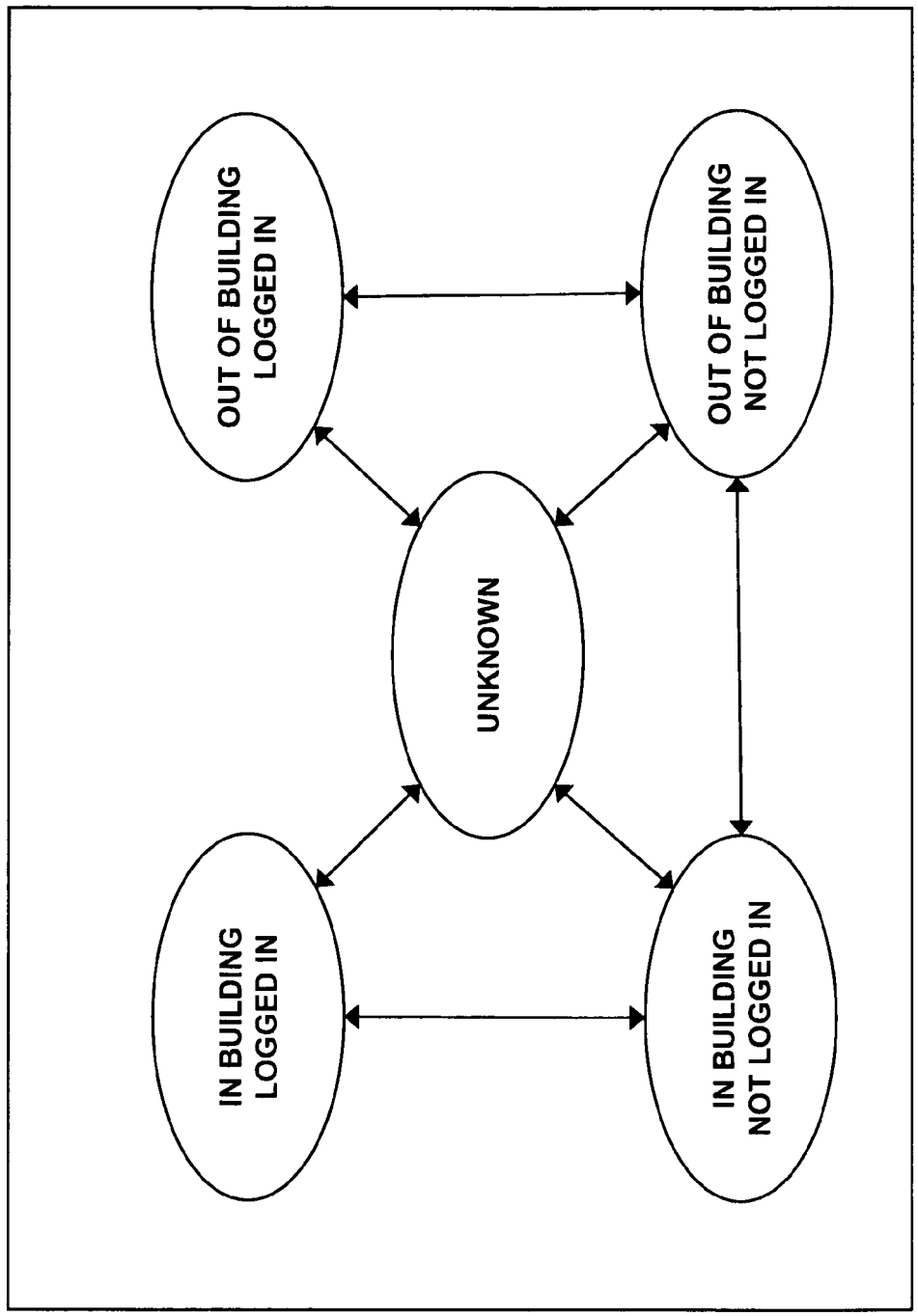
FIG. 5 is a state diagram illustrating possible user-states according to one embodiment of the present invention.

FIG. 5 represents possible "states" to which a user can be attributed, with each state representing his physical location and login status, and the paths among the states represent the possible transitions between states. Rules that use events from a PACS and/or access requests made to logical resources govern when a user transitions from one state to another. In some cases, inactivity for long periods of time or the triggering of conflicting rules may cause a user to be attributed to an "unknown" state, which in some cases may require human intervention or additional events to resolve.

For example, personnel who enter the facility controlled by the PACS by presenting a card can be assigned a state of "In Building Not Logged In." In some cases, however, personnel who gained access without presenting a badge (by tailgating, for example), may attempt to gain access to the system by presenting valid authentication credentials (either manually entered or retrieved from a client-resident agent installed on the user's computer) at a local machine. The user's logon credentials are verified (using Active Directory or lightweight directory access protocol, for example) and if they are valid, the user is logged into the network. Because the authentication server now knows the user is in the building and has access to the user's badge ID, the ID can be presented to Wiegand interface to virtually "badge in" the user to the PACS. Thus, the user is transitioned from "Not In Building Not Logged In" to "In Building Not Logged In" and then to "In Building Logged In." In some cases where a more specific location of the computer at which the user presented her credentials is known (e.g., the workstation is assigned to the manufacturing floor), the Wiegand interface can present a site-specific ID to the PACS, or otherwise modify the user's badge ID (using prefix or suffix character) to provide more granular location-based information. In addition, a client-resident agent can provide additional workstation-based information to the authentication server, such as when the user logged off the workstation, the last time the user has touched the computer, how long the computer has been idle, and/or whether the workstation is being turned off, or the laptop is being undocked.

Likewise, location-based authentication (presentation of a valid card, biometric credential, etc. to a PACS) can be used to update the user's state with regard to a logical resource such as a building server by querying the PACS with the user's badge ID (or other identity) and obtaining the last-known user location, time and any access credentials, and passing the credentials to a server. The user can then be automatically logged in to the server based solely on a valid PACS event.

In another example, a user known to be in the building based on presentation of a swipe card at an entry, but not be currently logged into any logical resource is in the "In Building Not Logged In" state. When the user presents valid authentication credentials to a logical resource from a computer connected to a LAN within the building, the user-state changes to "In Building Logged In."

For users attempting to establish remote access via a VPN server, logon credentials (such as IDs, static passwords and/or one-time-passwords generated by password tokens) are passed through the RADIUS Proxy to the RADIUS authentication server for verification. The logon information is intercepted by the RADIUS Proxy Server and passed to the network authentication server. When the user presents valid login credentials via a VPN, the authentication server recognizes the login attempt as being initiated from outside the building—which conflicts with the current state of "In Building." Because two events need to occur for a user to transition from the "In Building Not Logged In" state to the "Outside Building Logged In" state, the authentication server can effectively "badge-out" the user by presenting the user's badge ID to the Wiegand interface. The user is momentarily considered "Outside Building Not Logged In" and then transitions to the "Outside Building Logged In" state.

In some cases, users accessing the system via wireless access points may be located in the building (if the environment uses wireless computing within the building) or outside the building and using a public access point. Through recognition of the access point (via an IP address, MAC address, device name, or other identifying characteristic), the user can be attributed to either the "Outside Building Logged In" state (for unrecognized devices) or the "In Building Logged In" state for recognized devices.

In situations where the network authentication policy requires location-based authentication, real-time location service (RTLS) provides a non-intrusive way to establish, within a reasonable margin of error, the location of the user at that moment within the wireless coverage area, which in turn can be used as an additional factor for authentication. RLTS facilitates the determination of positions of users working with various wireless protocols (e.g., 802.11a, 802.11b, 802.11 g, and/or 802.11x) by correlating the relative signal strength (RSS) of signals being transmitted among wireless devices and wireless access points (WAPs). The signals may be generated by (i) the mobile device as received at different WAPs, (ii) multiple WAPs as received at the wireless device or (iii) a combination of both. Well-established algorithms exist for estimating positional coordinates from the RSS data using signal calibration data, and can account for environmental factors such as antenna placement, signal attenuation by buildings and walls, as well as variations in WAP and transceiver output power and receiver sensitivity. A calibration map can account for the variability in the number of WAPs with which a device can communicate at any given time as WAPs are added, removed or repositioned about the coverage area.

Authentication using RTLS data may be effectuated, for example, after a user has obtained wireless connectivity to the network through a WAP and is attempting to gain access to secure resources on the network, such as logging onto a Windows Domain or establishing a VPN connection to construct a secured communications channel.

In some embodiments, RTLS systems track a user's location based on the MAC address of the 802.11 transceiver in the user's device, and provide the spatial coordinates relative to one or more calibration maps for the coverage area. Using this data, the user's location relative to a particular building (e.g., inside or outside the building, or in a particular area within the building) can be established. The positional tolerance (which may be accurate to within 1 meter) allows enforcement of location-based authentication policies that can grant or deny network access depending on whether the requestor is inside or outside the facility walls. Conversely, the location-based data can be used to block unwanted access by sniffers or hackers attempting to gain access from outside the building perimeter.

The location-based data can be combined with the PACS and logical access data described above to provide a more comprehensive authentication policy. In a stand-alone fashion, RTLS allows the SSO server described above to incorporate location-based information into authentication and access decisions. In some embodiments, the location-based data can be used independently, whereas in some cases the information can be combined with physical access information to implement policies that combine the presentation of physical access credentials at a particular reader and the user's real-time location based on RTLS. Such a technique can, for example, facilitate a policy that grants access to secure network resources if the user presents a valid badge, has badged into a specific building, and is now within a specific location within the 802.11 coverage area and the RTLS data. The ability to infer the user's location from the 802.11 signature provides additional flexibility in defining the access policy, and can serve as an enhancement to other location-based authentication techniques.

The method in which the location is determined can be based on GPS satellite positioning, triangulation from a mesh of WAP or LWAPPs, or, in some embodiments, an RSS signature that is built at the client (based on RTLS data received at the client). By providing a client-side agent that can combine a location-based signature with other authentication data (e.g., biometrics, passwords, secure tokens, etc.), the system provides RTLS input to the global access server, thus allowing it to evaluate polices that combine input from physical access systems with real-time location-based information.

It is similarly possible in the above architecture for the SSO server to provide RTLS information to the PACS to complement auditing information maintained therein. In such embodiments, for example, an audit timeline may be generated, e.g., specifying the door used by an individual to gain physical access to a location, the credentials used to logon to the network, the MAC address of the device used, and the coordinates of the physical location within the facility from which the access was requested.

Thus, the invention allows physical access systems and wireless access points to contribute to the controlling of access to logical resources and vice versa by, for example, translating logon authentication requests into badge requests that are indistinguishable from conventional door-access requests, and augmenting such requests with location-based data. In addition, the ability of the PACS, the wireless system and the network authentication systems to exchange badge data, authentication credentials, and location data for both local and remote users provides a better accounting of personnel in the building. The system can be also identify individuals who gain access to a building without providing proper identification but present valid system credentials from within the building. As a result, the policies and rules that are used to grant and/or deny access at a physical card reader can be applied to control logical access to secure computer resources, and vice versa.

Thus, embodiments of the invention allow for the automatic disabling of access privileges if a user is disabled in either the logical or physical system, allow the location from which an individual is requesting access to be inferred from physical zones the user has passed through, leverage of existing infrastructure used for physical access control to augment multi-factor authentication for logical access without the need for custom integration components, deliver the ability to augment PACS data and network access requests with location-based data using the signal strengths of wireless access points distributed about the location, permit consolidated reporting of all physical and logical access requests, all using seamless integration among existing access control systems without the need for a logical connection.

In the embodiments of the invention described above, the software may be configured to run on any computer or workstation such as a PC or PC-compatible machine, an Apple Macintosh, a Sun workstation, etc. In general, any device can be used as long as it is able to perform all of the functions and capabilities described herein. The particular type of computer or workstation is not central to the invention, nor is the configuration, location, or design of the database, which may be flat-file, relational, or object-oriented, and may include one or more physical and/or logical components.

The servers may include a network interface continuously connected to the network, and thus support numerous geographically dispersed users and applications. In a typical implementation, the network interface and the other internal components of the servers intercommunicate over a main bi-directional bus. The main sequence of instructions effectuating the functions of the invention and facilitating interaction among clients, servers and a network, as well as the identity database, can reside on a mass-storage device (such as a hard disk or optical storage unit) as well as in a main system memory during operation. Execution of these instructions and effectuation of the functions of the invention is accomplished by a central-processing unit ("CPU").

A group of functional modules that control the operation of CPU and effectuate the operations of the invention as described above can be located in system memory (on the server or on a separate machine, as desired). An operating system directs the execution of low-level, basic system functions such as memory allocation, file management, and operation of mass storage devices. At a higher level, a control block, implemented as a series of stored instructions, responds to client-originated access requests by retrieving the user-specific profile and applying the one or more rules as described above.

The invention can be embodied in other specific forms without departing from the spirit or essential characteristics thereof. The foregoing embodiments are therefore to be considered in all respects illustrative rather than limiting on the invention described herein.

What is claimed is:

1. A method for according access to secure resources using a multi-factor authentication policy, the method comprising:
    receiving, at a first access-control system controlling access to a first secure resource, a first request from a user to access the first secure resource, the first request comprising a first user authentication credential;
    receiving, at a second access-control system (i) different from the first access-control system and (ii) controlling access to a second secure resource different from the first secure resource, a second request from the user to access the second secure resource, the second request comprising a second user authentication credential different from the first user credential; and
    in accordance with the multi-factor authentication policy, determining whether to accord the user access to the second resource based on at least (a) the second user credential and (b) whether the first access-control system accorded the user access to the first secure resource based on the first user authentication credential.

2. The method of claim 1, further comprising the step of determining whether to accord the user access to the first resource based on at least the first user credential.

3. The method of claim 1, wherein the first access-control system controls physical access to a site location and the second access-control system controls access to a computer system.

4. The method of claim 3, wherein the first authentication credential is a badge and the second authentication credential is one or more of a password, a screen name, a user identification code, a secure access code or biometric data.

5. The method of claim 3, wherein the first access-control system is one or more of a physical access control system, a video surveillance system, or a workflow system.

6. The method of claim 1, wherein the determination whether to accord the user access to the second resource is based in part on a time when the user was accorded access to the first resource.

7. The method of claim 1, wherein the second access-control system is one or more of an active directory-based computer system, a virtual private network, or a remote-access control system.

8. The method of claim 1, wherein the determining step is based also on a time-based access rule.

9. The method of claim 1, wherein the determining step is based also on an environmental state.

10. An authentication system comprising:
    a first access-control system controlling access to a first secure resource;
    a second access-control system (i) different from the first access-control system and (ii) controlling access to a second secure resource different from the first secure resource; and
    a global access server configured to:
        (i) provide user access policies based on rules associated with a plurality of access control systems;
        (ii) receive a first request from a user to access the first secure resource, the first request comprising a first user authentication credential presented to the first access-control system;
        (iii) receive a second request from the user to access the second secure resource, the second request comprising a second user authentication credential different from the first user credential and presented to the second access-control system; and
        (iv) in accordance an access policy for the user, determine whether to accord the user access to the second resource based on at least (a) the second user credential and (b) whether the first access-control system accorded the user access to the first secure resource based on the first user authentication credential.

11. The system of claim 10, wherein the global access server is further configured to accord the user access to the first resource based on at least the first user credential.

12. The system of claim 10, wherein the first access-control system controls physical access to a site location and the second access-control system controls access to a computer system.

13. The system of claim 10, wherein the first authentication credential is a badge and the second authentication credential is one or more of a password, a screen name, a user identification code, a secure access code or biometric data.

14. The system of claim 10, wherein the first access-control system is one or more of a physical access control system, a video surveillance system, or a workflow system.

15. The system of claim 10, wherein the global access server is further configured to determine whether to accord the user access to the second resource based in part on a time when the user was accorded access to the first resource.

16. The system of claim 10, wherein the second access-control system is one or more of an active directory-based computer system, a virtual private network, or a remote-access control system.

17. The system of claim 10, wherein the global access server is further configured to determine whether to accord the user access to the second resource based also on a time-based access rule.

18. The method of claim 1 wherein the the global access server is further configured to determine whether to accord the user access to the second resource based also on an environmental state.

* * * * *